United States Patent
Lu et al.

(10) Patent No.: US 8,242,050 B2
(45) Date of Patent: Aug. 14, 2012

(54) COMPOSITE FILTER AIDS HAVING NOVEL PORE SIZE CHARACTERISTICS

(75) Inventors: Jie Lu, Lompoc, CA (US); Jarrod R. Hart, Los Olivos, CA (US)

(73) Assignee: World Minerals, Inc., Santa Barbara, CA (US)

( * ) Notice: Subject to any disclaimer, the term of this patent is extended or adjusted under 35 U.S.C. 154(b) by 160 days.

(21) Appl. No.: 12/883,529

(22) Filed: Sep. 16, 2010

(65) Prior Publication Data

US 2012/0046165 A1    Feb. 23, 2012

Related U.S. Application Data (60) Provisional application No. 61/374,832, filed on Aug. 18, 2010.

(51) Int. Cl.
    *B01J 20/00* (2006.01)
    *B01D 39/00* (2006.01)
(52) U.S. Cl. ............... 502/407; 502/412; 210/502.1
(58) Field of Classification Search ............ 502/400, 502/407, 412; 210/502.1, 502, 660; 106/482; 428/404
See application file for complete search history.

(56) References Cited

U.S. PATENT DOCUMENTS

| 4,732,887 A | 3/1988 | Obanawa et al. |
| 5,389,268 A * | 2/1995 | Ito et al. .................. 210/777 |
| 2004/0055957 A1 | 3/2004 | Palm et al. |

FOREIGN PATENT DOCUMENTS

WO    WO 2008008940 A2 *    1/2008

OTHER PUBLICATIONS

International Search Report and Written Opinion issued Nov. 1, 2010, for PCT Application No. PCT/US10/49036.

* cited by examiner

*Primary Examiner* — Stanley Silverman
*Assistant Examiner* — Anthony J Zimmer
(74) *Attorney, Agent, or Firm* — Finnegan, Henderson, Farabow, Garrett & Dunner, L.L.P.

(57) ABSTRACT

Filter-aid materials are disclosed herein, as well as processes, systems, and methods using such filter-aid materials for filtering and removing particles and/or constituents from a fluid. Further disclosed herein are filter-aid materials and processes, systems, and methods using such filter-aid materials for filtering and removing particles and/or constituents from a fluid, wherein the filter-aid material comprises at least one composite filter-aid having novel pore size distribution and comprising at least one adsorbent component formed in-situ on at least one filtration component.

30 Claims, 2 Drawing Sheets

COMPOSITE FILTER AIDS HAVING NOVEL PORE SIZE CHARACTERISTICS

RELATED APPLICATIONS

This application hereby claims the rights and benefits of priority to U.S. Provisional Application No. 61/374,832, filed Aug. 18, 2010, the subject matter of which is incorporated by reference herein in its entirety.

FIELD OF DISCLOSURE

Disclosed herein are composite filter-aid materials having novel pore size characteristics, and processes, systems, and methods using such composite filter-aid materials for filtering and removing particles and/or constituents from a fluid. In one embodiment, the composite filter-aid material comprises at least one adsorbent component and at least one filtration component. In another embodiment, the composite filter-aid material provides surfaces with adsorbent capabilities.

BACKGROUND

In many filtration applications, a filtration device is comprised of both a filter element, such as a septum, and a filter-aid material. The filter element may be of any form such that it may support a filter-aid material, for example, a cylindrical tube or wafer-like structure covered with a plastic or metal fabric of sufficiently fine weave. The filter element may be a porous structure with a filter element void to allow material of a certain size to pass through the filtration device. The filter-aid material may comprise one or more filtration components, which, for example, may be inorganic powders or organic fibrous materials. Such a filter-aid material may be used in combination with a filter element to enhance filtration performance. Often, filtration components for use in a filter-aid material are comprised of materials such as diatomite, perlite, and cellulose. As an example illustrative of the field of filtration, the filter-aid material may initially be applied to the septum in a process known as "pre-coating." Pre-coating generally involves mixing a slurry of water and filter-aid material and introducing the slurry into a stream flowing through the septum. During this process, a thin layer, such as about 1.5 mm to about 3.0 mm, of filter-aid material may be eventually be deposited upon the septum, thus forming the filtration device.

During the filtration of a fluid, various insoluble particles in the fluid are trapped by the filter-aid material. The combined layers of filter-aid material and particles and/or constituents to be removed accumulate on the surface of the septum. Those combined layers are known as "filter cake." As more and more particles and/or constituents are deposited on the filter cake, the filter cake may become saturated with debris to the point where fluid is no longer able to pass through the septum. To combat that problem, a process known as "body feeding" is often used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake much the same way the filter-aid material bound to the septum during the pre-coating process. That additional layer of filter-aid material causes the filter cake to swell and thicken and increases the capacity of the cake to entrap additional debris. The filter aid typically has an open porous structure which maintains an open structure in the filter cake, thus ensuring continued permeability of the filter cake.

As mentioned above, in the field of fluid filtration many methods of particle separation employ, for example, materials chosen from diatomite, expanded perlite, natural glasses, and cellulose materials as porous filtration components. Those materials have intricate and porous structures that may be particularly suited to the effective physical entrapment of particles in filtration processes. Those intricate and porous structures create networks of void spaces that may result in buoyant filtration media particles that have apparent densities similar to those of the fluids in which they are suspended. It is common practice to employ porous filtration components when improving the clarity of fluids. The porous filtration component is often used to remove undesired particles or constituents such as particulate matter from a fluid. However, while well suited for the task of removing particulate matter by physical entrapment, those porous filtration components may not be as well suited for the task of removing particulate matter from a fluid by the process of adsorption and are thus often times used in combination with an adsorbent component.

Diatomite, perlite, rice-hull ash, and cellulose are some examples of filtration component materials that may be used for particle separation. Diatomite, also known as diatomaceous earth, is a sediment enriched in biogenic silica in the form of the siliceous frustules of diatoms, a diverse array of microscopic, single-cell algae. Those frustules are sufficiently durable to retain much of their microscopic structure through long periods of geological time and through thermal processing. Diatomite products have an inherently intricate and porous structure composed primarily of silica. Perlite is a naturally occurring volcanic glass that may thermally expand upon processing. The structure of perlite may not be as intricate as diatomite and, consequently, perlite may be better suited for separating coarse micro-particulates from liquids having high solids loading. Finally, cellulose filtration component materials are generally produced by sulfite or sulfate processing of hardwoods and/or softwoods. Like perlite, cellulose filtration component materials may possess a less intricate structure than diatomite filtration component materials.

As used herein, "turbidity" is the cloudiness or haziness of a fluid, where the haze may be caused by individual particles that are suspended in the fluid. Materials that may cause a fluid to be turbid include, for example, clay, silt, organic matter, inorganic matter, and microscopic organisms. Turbidity may be measured by using an instrument known as a nephelometric turbidimeter that emits a beam of light through a column of the fluid being tested. A detector positioned on the same side of the fluid column measures the amount of light reflected by the fluid. A fluid that contains a relatively large number of suspended particles will reflect a greater amount of light than a fluid containing fewer particles. Turbidity measured in this fashion may be quantified in Nephelometric Turbidity Units ("NTU"). Turbidity may also be measured via gravimetric methods.

A trade-off typically exists in filter-aid technology between the permeability of the porous media used as a filtration component and its turbidity removal capabilities. Filtration components are produced in grades over a wide range of permeability ratings. As the permeability of the filtration component decreases, the ability of the filter-aid material to remove small particles may increase, but often at the expense of a slower flow rate through the filter-aid material. Conversely, as the filtration component permeability increases, the ability of the filter-aid material to filter particles may decrease and, consequently, the fluid flow through the filter-aid material increases. The extent to which this takes place will depend upon the type and particle size distribution of the suspended particles being removed from the fluid.

As used herein, "wet density" is an indicator of a material's porosity. For example, wet density reflects the void volume available to entrap particulate matter in a filtration process and, consequently, wet density may be used to determine filtration efficiency. Percent porosity may be expressed by the following formula:

Porosity=100*[1−(wet density/true density)].

Thus, filtration components with lower wet densities may result in products with greater porosity, and thus perhaps greater filtration efficiency, provided that the true density stays relatively constant. Typical wet densities for common filtration components may range from at least about 12 lb/ft$^3$ to about 30 lb/ft$^3$ or greater.

As used herein, "adsorption" is the tendency of molecules from an ambient fluid phase to adhere to the surface of a solid. This is not to be confused with the term "absorption," which results when molecules from an ambient fluid diffuse into a solid, as opposed to adhering to the surface of the solid.

To achieve a desired adsorptive capacity, and thus to be practical for commercial use, an adsorbent component may have a relatively large surface area, which may imply a fine porous structure. In certain embodiments, porous adsorbent components, in their un-reacted powder form, can have surface areas ranging up to several hundred m$^2$/g.

One technique for calculating specific surface area of physical adsorption molecules is with the Brunauer, Emmett, and Teller ("BET") theory. The application of BET theory to a particular adsorbent component yields a measure of the materials specific surface area, known as "BET surface area." Generally speaking, BET surface areas of practical adsorbent components in their un-reacted powder form may range from about 50 to about 1200 m$^2$/g. As used herein, "surface area" refers to BET surface area.

Filtration components with different BET surface areas and/or different total pore areas may result in different adsorption capacity and filtration rate. Typically, a filter aid with a lower BET and/or lower total pore area tends to have a lower adsorption capacity and a faster filtration rate. Calcined diatomaceous earth filter aids and expanded and milled perlite filter aids are generally used as filter aids with minimal adsorption function, because of the low surface area, typically<10 m$^2$/g. Adsorbent components, such as silica gels, are generally high in BET surface areas or total pore areas, but their filtration rates are generally slow, due to a much finer particle size distribution and/or the lack of the porosity of a filter aids. The fine particles can block the pores in filtration, and the high surface area may create more drag on the flow, thus causing the filtration rate drop significantly.

One technique for describing pores size distributions uses mercury intrusion under applied isostatic pressure. In this method an evacuated powder is surrounded by liquid mercury in a closed vessel and the pressure is gradually increased. At low pressures, the mercury will not intrude into the powder sample due to the high surface tension of liquid mercury. As the pressure is increased, the mercury is forced into the sample, but will first intrude into the largest spaces, where the curvature of the mercury surface will be the lowest. As pressure is further increased, the mercury is forced to intrude into tighter spaces. Eventually all the voids will be filled with mercury. The plot of total void volume vs. pressure can thus be developed. The method can thus provide not only total pore volume but also distinguish a distribution of pore sizes.

Note that Mercury Intrusion Porosimetry cannot distinguish between intra- and inter-particle voidage and thus some knowledge of particle size and shape may be needed for plot interpretation. Furthermore, some pore shapes (such as large pores with small access ports, the so-called inkwell pore) can fill at misleadingly high pressures, so in effect the method is providing an estimation of the true pore size distribution and not a direct measurement. Once a distribution of pores has been estimated, it is possible to calculate an estimation of surface area based on the pore sizes, assuming a pore shape (a spherical shape is commonly assumed). Median pore size estimates can also be calculated based on volume or area. Median pore size (volume) is the pore size at $50^{th}$ percentile at the cumulative volume graph, while median pore size (area) is the $50^{th}$ percentile at the cumulative area graph. The average pore size (diameter) is 4 times the ratio of total pore volume to total pore area (4V/A).

One method of using an adsorbent component is to place the adsorbent component in contact with a fluid containing particles and/or constituents to be adsorbed, either to purify the fluid by removing the particles and/or constituents, or to isolate the particles and/or constituents so as to purify them. In certain embodiments, the adsorbent component containing the adsorbed particles or constituents is then separated from the fluid, for example by a conventional filtration process.

An illustrative example of an adsorption practice may be seen in the process of beer "chill-proofing." It is currently known that, unless specially treated, chilled beer may undergo a chemical reaction that results in the production of insoluble particles. In that chemical reaction, hydrogen bonds may form between haze-active proteins and/or polyphenols in a chilled condition. The reacted proteins and/or polyphenols may then grow to large particles, which cause the beer to become turbid, a condition also known as "chill-haze." Chill-haze may be undesirable to both consumers and brewers. Turbidity may be most pronounced when the beer has been chilled below room temperature. In certain instances, such as when the particles are proteins, as the temperature increases, the hydrogen bonds that hold the proteins together may be broken.

Chill-proofing may comprise a process that employs at least one adsorption component and/or at least one filtration component to remove particles creating chill-haze in the beer. One form of chill-proofing involves, in one step, adding solid adsorbent components, such as silica gel, to the beer prior to packaging. The particles and/or constituents bind to the added adsorbent components, and then, in a second step, the adsorbent components are subsequently filtered from the beer, which is then packaged for storage, sale, and/or consumption.

Filtration processes that implement both an adsorption step and a filtration step may be less efficient because of the difficulties of filtering the adsorbent components. For example, the adsorbent components may occupy void spaces of the porous filter-aid material. That occupancy may reduce the permeability of the filter-aid material, leading to an overall lower filtration flow rate, or may require the addition or more filter-aid material at additional cost, and may also result in the faster consumption of available volume in the filter housing.

There have been previous attempts to improve upon the traditional process of chill-proofing. Earlier attempts involved creating a simple mixture of an adsorbent component and a filtration component to combine the filtration and adsorption steps into one, thus eliminating the need to filter the adsorbent components. The term "simple mixture" is used herein to describe a composition comprising at least one adsorbent component and at least one filtration component where the two components are not chemically bonded, thermally sintered, or precipitated together. Simple mixtures may be somewhat ineffective as the components may be subject to separation due to physical distress often experienced in packaging and shipping. Furthermore, the particle shape characteristics of the adsorbent component may mean that these particles do not aid filtration in the way the filtration component particles do by ensuring the continued permeability of a filter cake. Thus the particles of the adsorbing component would take up valuable void space in the filter cake, thus reducing permeability or requiring more of the filtration component to maintain permeability.

SUMMARY

In one aspect, a composite filter aid may include at least one filtration component and at least one adsorption component, wherein the composite filter aid has an Average Pore Diameter (4V/A) ranging from about 0.1 microns to about 0.5 microns and a permeability ranging from about 50 to about 1000 millidarcies.

In another aspect, a composite filter aid include at least one filtration component and at least one adsorption component, wherein the composite filter aid has an Average Pore Diameter (4V/A) ranging from about 0.1 microns to about 0.5 microns and a Total Pore Area ranging from about 10 to about 100 $m^2/g$.

In yet another aspect, a composite filter aid may include at least one filtration component and at least one adsorption component, wherein the composite filter aid has a pore diameter ratio of at least about 200. For example, the composite filter aid can have a pore size ratio of at least about 400 or at least about 500. In another aspect, the composite filter aid can have a pore size ratio ranging from about 200 to about 2000 or from about 200 to about 1000.

In yet another aspect, the composite filter aid material further has an Average Pore Diameter (4V/A) ranging from about 0.1 microns to about 0.3 microns.

In yet another aspect, the composite filter aid material further has a Total Pore Area ranging from about 20 to about 80 $m^2/g$, such as from about 25 to about 65 $m^2/g$, about 30 to about 50 $m^2/g$, or about 30 to about 40 $m^2/g$.

In another aspect the composite filter aid material further has a BET surface area ranging from about 30 to about 200 $m^2/g$, such as from about 50 to about 110 $m^2/g$.

In yet another aspect, the composite filter aid material has a median particle size ranging from about 5 microns to about 40 microns.

In another aspect, the composite filter aid material has a permeability ranging from about 50 millidarcies to about 5000 millidarcies, such as from about 50 millidarcies to about 1000 millidarcies, from about 100 millidarcies to about 500 millidarcies, or from about 125 millidarcies to about 400 millidarcies.

In yet another aspect, the composite filter aid material has a median pore diameter (volume) ranging from about 1 micron to about 10 microns, such as from about 3 microns to about 6 microns.

In another aspect, the composite filter aid material has a median pore diameter (area) ranging from about 1 nm to about 50 nm, such as from about 1 nm to about 10 nm.

In another aspect, the composite filter aid material has a porosity ranging from about 70% to about 95%, such as, for example, ranging from about 70% to about 80%.

In another aspect, the composite filter aid material can include a diatomite. In some aspects the diatomite can include a natural diatomite. In other aspects, the diatomite can include a calcined diatomite, a flux-calcined diatomite, or a flash-calcined diatomite. In other aspects, the composite filter aid material can include perlite. In yet other aspects, the composite filter aid material can include a precipitated silica.

In yet another aspect, the at least one adsorbent component comprises from about 5% to about 40% by weight of the composite filter-aid, such as from about 10% to about 30% by weight of the composite filter-aid.

In another aspect, the composite filter-aid can be used for the chill-proofing of beer.

In another aspect, the composite filter aid can be used for the removal or adsorption of soluble metals from a liquid.

In yet another aspect, the composite filter aid includes at least one filtration component and at least one adsorption component, and has a permeability ranging from about 50 millidarcies to about 1000 millidarcies, a BET surface area ranging from about 30 to about 200 $m^2/g$, and a ratio of median pore diameter (volume) to median pore diameter (area) of at least about 200.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

DETAILED DESCRIPTION OF THE DISCLOSURE

A. Exemplary Composite Filter Aid

The present invention may provide a composite filter aid having novel pore size characteristics. As used herein, the term "composite filter aid" simply means a material comprising at least one filter aid component and at least one adsorbent component that is tightly bonded thereto. The composite filter aid can have properties significantly different from either constituent filtration or adsorbent component alone.

The composite filter-aid materials disclosed herein may comprise at least one adsorbent component and at least one filtration component, each having pores through which a fluid can pass. In certain embodiments, a composite filter aid that has an advantageous combination of pore size characteristics that can be expressed as a "pore size ratio."

Porosity characteristics may be measured by any appropriate measurement technique known to the skilled artisan or hereafter discovered. Examples of porosity measurements may include, but are not limited to, measurements of pore volume, average pore diameter, median pore diameter, and total pore area. In some embodiments, pore volume is measured with an AutoPore IV 9500 series mercury porosimeter from Micromeritics Instrument Corporation (Norcross, Ga., USA), which can measure pore diameters ranging from 0.006 to 600 µm, using a contact angle set at about 130 degrees and a pressure ranging from about 0 psi to about 33000 psi.

As defined herein, the term "pore size ratio" simply refers to the ratio of pore size diameter (Volume) to pore size diameter (Area) as measured using a Micromeritics AutoPore IV Porosimeter. Median pore diameter (Volume; V50) is the median pore diameter calculated at the 50% of the total intrusion volume; median pore diameter (Area; A50) is the median pore diameter calculated at the 50% of the total pore area, as reported by the Micromeritics AutoPore IV Porosimeter.

"BET surface area," as used herein, refers to the technique for calculating specific surface area of physical absorption molecules according to Brunauer, Emmett, and Teller ("BET") theory. BET surface area may be measured by any appropriate measurement technique known to the skilled artisan or hereafter discovered. In some embodiments, BET surface area is measured with a Gemini III 2375 Surface Area Analyzer, using nitrogen as the sorbent gas, from Micromeritics Instrument Corporation (Norcross, Ga., USA).

In certain embodiments, the pore size ratio of the composite filter aid can have a value of greater than 200, such as, for example, greater than 250, greater than 300, greater than 350, greater than 400, greater than 450, greater than 500, greater than 550, greater than 600, greater than 650, or even greater than 700. In other embodiments, the pore size ratio of the composite filter aid ranges from about 200 to about 2000, such as, for example, from about 200 to about 1000, or from about 200 to about 800. In yet other embodiments, the pore size ratio of the composite filter aid ranges from about 200 to about 1000, such as, for example, from about 300 to about 1000, from about 400 to about 1000, from about 500 to about 1000, from about 600 to 1000, or from about 700 to 1000.

While not wishing to be bound by theory, it is hypothesized that filter aids having a higher pore size ratio will exhibit improved properties in some applications. For example, the high median pore diameter (volume) of the composite filter aid material appears to correlate to that of the filtration component and may help to increase particulate holding capacity and higher permeability. On the other hand, the median pore diameter (area) of the composite filter aid material appears to correlate to that of the adsorbent component and the adsorptive properties thereof, which may provide for the beneficial removal the proteins that can cause chill haze. Accordingly, composite filter aids according to at least some embodiments have a pore size ratio engineered to provide an advantageous combination of pore size characteristics of both the filtration and adsorbent components when used in beverage filtration applications.

In certain embodiments, the composite filter aid material has a Median Pore Diameter (Volume) of greater than about 3.5 microns, such as greater than about 4 microns. In other embodiments, the composite filter aid material has a Median Pore Diameter (Volume) ranging from about 1 micron to about 10 microns, such as from about 3 microns to about 6 microns, from about 4 microns to about 6 microns, or from about 4 microns to about 5 microns.

In certain embodiments, the composite filter aid material can have a median pore diameter (Area) of less than about 100 nm, such as, for example, less than about 50 nm or less than about 10 nm. In other embodiments, the composite filter aid material can have a median pore diameter (Area) ranging from about 1 nm to about 50 nm, such as, for example, from about 1 nm to about 10 nm or from about 5 nm to about 10 nm.

In yet other embodiments, the composite filter aid material can have a Total Pore Area ranging from about 10 to about 100 $m^2/g$, such as, for example, about 20 to about 80 $m^2/g$, from about 25 to about 65 $m^2/g$, from about 30 to about 50 $m^2/g$, or from about 30 to about 40 $m^2/g$.

In some embodiments, the composite filter-aid material comprises at least one adsorbent component that has been precipitated in-situ on the surface of the at least one filtration component. A filter element may be used to support the composite filter-aid material. In some embodiments, the filter element contains filter element voids through which fluid may flow. The filter-aid materials comprising at least one composite filter-aid may retain both the adsorptive properties of the at least one adsorbent component and the porous structure of the at least one filtration component, thus enhancing the utility of the filter-aid materials comprising at least one composite filter-aid.

In some embodiments, the at least one adsorbent component is precipitated in-situ onto the surface of the at least one filtration component. As a result, while simple mixtures may segregate upon suspension (e.g., in fluid, conveyance, or transport), the filter-aid material comprising at least one composite filter-aid may retain both its component adsorptive and filtration properties. The in-situ precipitation of the at least one adsorbent component on the at least one filtration component may also have superior absorptive and filtration properties than a thermally sintered or chemically bonded composite, because the in-situ precipitation process may produce a filter-aid material comprising at least one composite filter-aid, wherein the adsorbent components are distributed evenly on the filtration component and, consequently, exhibits a larger surface area for adsorption. The larger surface area may allow the filter-aid material comprising at least one composite filter-aid to adsorb a greater number of particles and/or constituents which, in turn, may result in a lower turbidity level for the filtered fluid.

In certain embodiments, the BET surface area of the at least one filtration component is greater than about 2 $m^2/g$. In some embodiments, the BET surface area of the at least one filtration component ranges from about 2 $m^2/g$ to about 10 $m^2/g$.

In other embodiments, the BET surface area of the at least one adsorbent component is greater than about 2 $m^2/g$. In another embodiment, the BET surface area of the at least one adsorbent component is greater than about 10 $m^2/g$. In yet other embodiments, the BET surface area of the at least one adsorbent component is greater than about 25 $m^2/g$. In still further embodiments, the BET surface area is greater than about 50 $m^2/g$. In still other embodiments, the BET surface area of the at least one adsorbent component is greater than about 85 $m^2/g$. In still further embodiments, the BET surface area of the at least one adsorbent component is greater than about 125 $m^2/g$. In other embodiments, the BET surface area of the at least one adsorbent component is greater than about 250 $m^2/g$. In further embodiments, the BET surface area of the at least one adsorbent component ranges from about 30 $m^2/g$ to about 200 $m^2/g$. In yet other embodiments, the BET surface area of the at least one adsorbent component ranges from about 50 $m^2/g$ to about 100 $m^2/g$.

In some embodiments, the BET surface area of the composite filter aid material is greater than about 10 $m^2/g$, greater than about 25 $m^2/g$, or greater than about 50 $m^2/g$. In a further embodiment, the BET surface area of the composite filter aid material ranges from about 30 to about 200 $m^2/g$, such as, for example, from about 50 to about 110 $m^2/g$ or from about 50 to about 75 $m^2/g$.

The large BET surface area of the at least one adsorbent component may allow the filter-aid materials comprising at least one composite filter-aid to reduce the number of particles and/or constituents that contribute to turbidity of the fluid. The filter-aid materials comprising at least one composite filter-aid may entrap particles and/or constituents from the unfiltered fluid, resulting in the filtered fluid having fewer particles and/or constituents. Further, the turbidity of a fluid filtered through the filter-aid materials comprising at least one composite filter-aid disclosed herein may be less than the turbidity of a fluid filtered through a simple mixture of at least one adsorbent component and at least one filtration component, where the proportion of adsorbent component to filtration component in the simple mixture is similar to, or even greater than, the proportion of adsorbent component to filtration component of the filter-aid materials comprising at least one composite filter-aid disclosed herein. Further, the turbidity of a fluid filtered through the filter-aid materials comprising at least one composite filter-aid disclosed herein may be less than the turbidity of a fluid filtered through a thermally-sintered or chemically-bonded composite of an adsorbent component and a filtration component, where the proportion of adsorbent component to filtration component in the thermally-sintered or chemically-bonded composite is similar to, or even greater than, the proportion of adsorbent component to filtration component of the filter-aid materials comprising at least one composite filter-aid disclosed herein.

The filter-aid materials comprising at least one composite filter-aid disclosed herein may be processed to provide a wide range of flow rates, which are directly related to permeability. Permeability may be reported in units of darcies or millidarcies ("md"). One darcy corresponds to the permeability through a filter medium 1 cm thick which allows 1 $cm^2$ of fluid with a viscosity of 1 centipoise to pass through an area of 1 $cm^2$ in 1 second under a pressure differential of 1 atm (i.e., 101.325 kPa). Permeability may be determined using a device designed to form a filter cake on a septum from a suspension of filter-aid material in water, and then measuring the time required for a specified volume of water to flow through a measured thickness of filter cake of known cross-sectional area. Many filtration media suitable for micro filtration, such as diatomite and perlite products, are commercially available and span a wide range of permeability, ranging from about 0.001 darcy to over 30 darcies, such as from about 0.05 darcies to over 10 darcies. Filter-aid material for coarse filtration, such as sand, may have greater permeabilities, such as at least about 1000 darcies.

The selection of filtration permeability for a specific filtration process depends in part on the flow rate and degree of fluid clarification required for the particular application. In many cases, the flow of fluid through a filter-aid material may be closely related to the nature of the filtration component's porosity. Within a given family of filtration components, those of low permeability may have smaller pores capable of providing greater clarity because smaller particles can be retained during the filtration process, whereas those of high permeability may have larger pores capable of providing greater fluid flow, but usually at the expense of the ability to remove particles as small as those removed by their low permeability counterparts.

The adsorbent component may be selected from any suitable adsorbent known to the skilled artisan or hereafter discovered. In certain embodiments, the adsorbent may be a form of silica. In some embodiments, the at least one adsorbent component may be chosen from the various polymorphs of silica. Silica gels, for example, are a form of silicon dioxide ($SiO_2$), which may occur in nature as sand. In general, however, sand is typically crystalline and non-porous while silica gels are non-crystalline and may be porous. In some embodiments, the at least one adsorbent component may be a precipitated silica. In some embodiments, the at least one adsorbent component may be a colloidal silica. In some embodiments, the at least one adsorbent component may be a fumed silica. In some embodiments, the at least one adsorbent component may be a silica fume. In some embodiments, the at least one adsorbent component is chosen from silicates. Non-limiting examples of suitable silicates include aluminosilicate, calcium silicate, and magnesium silicate. In still other embodiments, the at least one adsorbent component is chosen from an alumina. In some embodiments, the alumina adsorbent component is an aluminosilicate. In some embodiments, the alumina adsorbent component is a porous alumina.

Filtration components suitable for use in preparation of the filter-aid materials comprising at least one filterable composite adsorbent disclosed herein may possess a variety of pore sizes. In one embodiment, the filtration component pore size is a relatively large pore size, for example, a mean pore diameter of about 1 to about 10 microns, such as, for example, from about 2 to about 10 microns, such that it is particularly well-suited for particle entrapment, thereby permitting mechanical filtration and/or clarification by means of removal of particles and/or constituents. In other embodiments, the filtration component pore size is a relatively small pore size, for example, a mean pore diameter of about 2 microns.

Filtration components suitable for use in the preparation of the filterable composite adsorbent disclosed herein may possess a variety of surface areas. In some embodiments, the filtration component may have a relatively large surface area. In some embodiments, the filtration component may have a relatively small surface area.

Without wishing to be bound by theory, it is believed that a filtration component with a large surface area may allow for a reduction in the thickness of an adsorbent component coating which may be formed thereon, for example, a precipitated silica.

The reduced thickness of the adsorbent coating is believed to provide for more sites for adsorption of the particles and/or constituents to be removed. In some embodiments, the surface area of the filtration component is at least about 1 $m^2/g$. In some embodiments, the surface area is at least about 3 $m^2/g$. In some embodiments, the surface area is at least about 15 $m^2/g$. In some embodiments, the surface area is at least about 30 $m^2/g$. In some embodiments, the surface area is at least about 50 $m^2/g$. In some embodiments, the surface area ranges from about 1 $m^2/g$ to about 100 $m^2/g$. In some embodiments, the surface area is less than about 500 $m^2/g$.

In additional aspects, the filter-aid materials comprising at least one composite filter-aid disclosed herein also may exhibit various wet densities. For example, the filter-aid material comprising at least one composite filter-aid may have a wet density ranging from about 10 to about 25 $lb/ft^3$. As wet density reflects the void volume of the adsorbent component to entertain matter in the filtration process, a lower wet density may indicate that the adsorbent component has a high void volume and thus can adsorb more particles and/or constituents in the fluid.

In some embodiments, the at least one filtration component and/or the at least one additional filtration component includes diatomite (a biogenic silica). In some embodiments, the at least one filtration component includes perlite (a natural glass). In some embodiments, the filtration components are chosen from biogenic silica, including but not limited to diatomite, rice hull ash, and sponge spicules. In some embodiments, the filtration components are chosen from buoyant glasses. One example of buoyant glasses are natural glasses, including but not limited to pumice, expanded pumice, pumicite, expanded obsidian, expanded volcanic ash, and sand. In some embodiments, the filtration components are chosen from synthetic glasses. Examples of synthetic glasses include but are not limited to fiber glass, controlled pore glass, and foamed glass. In some embodiments, the filtration components are chosen from buoyant polymers. Buoyant polymers include but are not limited to fibrous polymers (such as fibrous nylon and fibrous polyester) and powdered polymers (such as polyvinylchloride-acrylic copolymer powder). In some embodiments, the filtration components are chosen from cellulose. The at least one filtration component and the at least one additional filtration component (if used) may be the same or different. In some embodiments, the filtration components are the same. In some embodiments, the filtration components are different.

The term "biogenic silica" as used herein refers to silica produced or brought about by living organisms. One example of biogenic silica is diatomite, obtained from diatomaceous earth (also known as kieselguhr), which is a sediment enriched in biogenic silica in the form of the siliceous frustules (i.e., shells or skeletons) of diatoms. Diatoms are a diverse array of microscopic, single-celled algae of the class *Bacillariophyceae*, which possess an ornate siliceous skeleton (i.e., frustule) of varied and intricate structure comprising two valves which, in the living diatom, fit together much like a pill box. The morphology of the frustules may vary widely among species and serves as the basis for taxonomic classification; at least 2,000 distinct species are known. The surface of each valve is punctuated by a series of openings that comprise the complex fine structure of the frustule and impart a design that is distinctive to individual species. The size of typical frustules may range from about 0.75 μm to about 1,000 μm. In one embodiment, the size ranges from about 10 μm to about 150 μm. Those frustules are sufficiently durable to retain much of their porous and intricate structure virtually intact through long periods of geologic time when preserved in conditions that maintain chemical equilibrium. Other sources of biogenic silica are known, as many plants, animals, and microorganisms provide concentrated sources of silica with unique characteristics. For example, rice hulls contain sufficient silica that they are commercially ashed for their siliceous residue, a product known familiarly as "rice hull ash." Certain sponges are also concentrated sources of silica, the remnants usually occurring in geologic deposits as acicular spicules.

The term "natural glass" as used herein refers to natural glasses, commonly referred to as volcanic glasses, that are formed by the rapid cooling of siliceous magma or lava. Several types of natural glasses are known, including, for example, perlite, pumice, pumicite, obsidian, and pitchstone. Prior to processing, perlite may be gray to green in color with abundant spherical cracks that cause it to break into small pearl-like masses. Pumice is a lightweight glassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as tuff when in consolidated form, comprises small particles or fragments that may be in glassy form. As used herein, the term natural glass encompasses volcanic ash.

Natural glasses may be chemically equivalent to rhyolite. Natural glasses that are chemically equivalent to trachyte, dacite, andesite, latite, and basalt are known but may be less common. The term obsidian is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72 to about 75% $SiO_2$, about 12 to about 14% $Al_2O_3$, about 0.5 to about 2% $Fe_2O_3$, about 3 to about 5% $Na_2O$, about 4 to about 5% $K_2O$, about 0.4 to about 1.5% CaO (by weight), and small amounts of other metallic elements. Perlite may be distinguished from other natural glasses by a higher content (such as about 2 to about 5% by weight) of chemically-bonded water, the presence of a vitreous, pearly luster, and characteristic concentric or arcuate onion skin-like (i.e., perlitic) fractures.

Perlite products may be prepared by milling and thermal expansion, and may possess unique physical properties such as high porosity, low bulk density, and chemical inertness.

Pumice is a natural glass characterized by a mesoporous structure (e.g., having pores or vesicles with a size up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers. Unexpanded pumice and thermally-expanded pumice may also be used as filtration components in some cases as can volcanic ash.

The appropriate selection of the at least one adsorbent component and the at least one filtration component of the filter-aid materials comprising at least one composite filter-aid, as well as any at least one additional filtration component, disclosed herein may be determined by the specific application intended. For example, in a filtration process that demands high clarity but tolerates slower flow rate, a filter-aid material comprising at least one composite filter-aid of low permeability may be used, whereas in a filtration process that demands high flow rate but does not require high clarity, a filter-aid materials comprising at least one composite filter-aid of high permeability may be used. Similar reasoning applies to the choice of the at least one adsorbent component, and to the at least one composite filter-aid when used in conjunction with other materials, or when preparing mixtures containing the products.

In some embodiments, silica may be precipitated in-situ onto diatomite, a biogenic silica. The resulting composite has both of the adsorption capabilities, for example, beer chillproofing capability, obtained from the precipitated silica adsorbent, as well as the filtration properties of the diatomite filtration component. In some embodiments, the resulting precipitated silica/diatomite composite filter-aid may further be mixed with an at least one additional filtration component. In some embodiments, the at least one additional filtration component may also comprise diatomite. In some embodiments, the at least one additional filtration component may comprise a filtration component that is different than diatomite.

B. Exemplary Methods for Preparing Exemplary Composite Filter-Aids

Sodium silicate is used herein to refer to any one of several compounds comprising sodium oxide ($Na_2O$) and silica ($SiO_2$). Such combinations may include, for example, sodium ortho silicate ($Na_4SiO_4$), sodium meta silicate ($Na_2SiO_3$), and sodium disilicate ($Na_2Si_2O_5$). In some embodiments, the sodium silicate is a diatomite-based sodium silicate. In some embodiments, sodium silicate is substituted in whole or in part for at least one ammonium silicate and/or at least one alkali metal silicate, such as lithium, sodium, potassium, rubidium, and cesium silicates. Sodium silicate with a $SiO_2/Na_2O$ ratio of ~3.2:1 and a concentration of 20% may be purchased, for example, from World Minerals Inc. Sodium silicate with a $SiO_2/Na_2O$ ratio of ~3:1 and a concentration of 34.6% may be purchased, for example, from PQ Corp.

A filtration component, chosen from among any suitable filtration component previously known or hereinafter discovered, can be mixed with water to form a free-flowing suspension. In some embodiments, the filtration component can be the commercially-available filtration component Celite Standard Super Cel®, manufactured by World Minerals, Inc. In some embodiments, the filtration component can be a commercially-available filtration component selected from the group including Celite 3Z®, Celite 577®, Celite 289®, Celite 512®, Celite Filter-Cel®, and Celite Hyflo Super-Cel®, all manufactured by World Minerals, Inc.

Sodium silicate solution is then added to the filtration component suspension, raising the pH. The mass ratio of sodium silicate to the filtration component may be, for example, about 1:3, but any ratio is possible.

An acid, or a salt thereof, may then be added to the slurry in an amount sufficient to increase the acidity (i.e., reduce the pH) of the slurry to a pH range suitable for the precipitation of silica gel. Any suitable acid may be selected, such selection being within the know-how of one skilled in the art. In some embodiments, the acid may be sulfuric acid. In other embodiments, the acid may be phosphoric acid. In still other embodiments, the acid may by hydrochloric acid. In yet other embodiments, the acid may be nitric acid. In still other embodiments, the acid may be acetic acid.

As the pH lowers, the slurry is stirred periodically until gelling occurs. This may take about 25 to about 60 minutes depending upon the acidity of the solution and the sodium silicate concentration in the slurry. The slurry is then filtered. Water may be added to the suspension to aid filtration. The resulting cake may be washed with water. Then the cake is dried until the excess fluid in the cake has evaporated. For example, the cake may be dried at a temperature ranging from about 110° C. to about 200° C.

The amount of the sodium silicate added may be chosen to control the pore size distribution in the composite filter-aid and/or final filter-aid material. While increasing the percentage of silica gel generally acts to increase the filter-aid material's ability to act as an adsorbent, it generally acts to decrease its ability to act as a filter material. Conversely, decreasing the percentage of silica gel generally acts to decrease the filter-aid material's ability to act as an adsorbent while increasing its ability to act as a filter material.

Accordingly, the amount of the adsorbent component in the composite filter-aid may comprise from between greater than about 0 to about 100% by weight of the total composite filter-aid. In some embodiments, the adsorbent component may comprise greater than about 5% by weight of the total composite filter-aid. In other embodiments, the adsorbent component may comprise greater than about 15% by weight of the total composite filter-aid. In other embodiments, the adsorbent component may comprise greater than about 25% by weight of the total composite filter-aid. In other embodiments, the adsorbent component may comprise less than about 40% by weight of the total composite filter-aid. In other embodiments, the adsorbent component may comprise less than about 50% by weight of the total composite filter-aid. In other embodiments, the adsorbent component may comprise from about 5% and about 40% by weight of the total composite filter-aid. In other embodiments, the adsorbent component may comprise from about 15% and 25% by weight of the total composite filter-aid.

The amount of the filtration component in the composite filter-aid may comprise from between greater than about 0 to about 100% by weight of the total composite filter-aid. In some embodiments, the filtration component may comprise greater than about 25% by weight of the total composite filter-aid. In other embodiments, the filtration component may comprise greater than about 50% by weight of the total composite filter-aid. In other embodiments, the filtration component may comprise greater than about 70% by weight of the total composite filter-aid. In other embodiments, the filtration component may comprise less than about 80% by weight of the total composite filter-aid. In other embodiments, the filtration component may comprise less than about 90% by weight of the total composite filter-aid. In other embodiments, the filtration component may comprise from about 60% to about 95% by weight of the total composite filter-aid. In other embodiments, the filtration component may comprise from about 75% to about 85% by weight of the total composite filter-aid.

In some embodiments, the adsorbent component may comprise from about 5% to about 40% by weight of the total composite filter-aid and the filtration component may comprise from about 60% to about 95% by weight of the total composite filter-aid. In other embodiments, the adsorbent component may comprise from about 15% to about 25% by weight of the total composite filter-aid and the filtration component may comprise from about 75% to about 85% by weight of the total composite filter-aid. In further embodiments, the composite filter-aid comprises a greater amount by weight of the adsorbent component than the filtration component.

After formation of the filterable composite adsorbent, the filterable composite adsorbent may then be mixed with at least one additional filtration component. The at least one additional filtration component may be chosen from any suitable filtration component previously known or hereinafter discovered and may be either the same or different from the at least one filtration component in the filterable composite adsorbent. In some embodiments, the additional filtration component is the commercially-available filtration component Celite Standard Super-Cel®, manufactured by World Minerals, Inc. In other embodiments, the additional filtration component is the commercially-available filtration component Celite 3Z®, manufactured by World Minerals Inc. In other embodiments, the additional filtration component is the commercially-available filtration component Celite Hyflo Super-Cel®, manufactured by World Minerals, Inc. In further embodiments, the additional filtration component is the commercially-available filtration component Celite 512®, manufactured by World Minerals, Inc. In further embodiments, the filtration component is the commercially-available filtration component Celite 512Z®, manufactured by World Minerals, Inc. In yet other embodiments, the additional filtration component is the commercially-available filtration component Celite 289®, manufactured by World Minerals, Inc. In yet a further embodiment, the additional filtration component is the commercially-available filtration component Filter-Cel®, manufactured by World Minerals, Inc.

In embodiments in which the filter-aid material comprising at least one composite filter-aid further comprises at least one additional filtration component, the additional filtration component may comprise from greater than about 0% to about 100% of the total weight of the filter-aid material. In some embodiments, the additional filtration component may comprise greater than about 5% by weight of the total filter-aid material. In other embodiments, the additional filtration component may comprise greater than about 30% by weight of the total filter-aid material. In further embodiments, the additional filtration component may comprise greater than about 50% by weight of the total filter-aid material. In yet other embodiments, the additional filtration component may comprise greater than about 65% by weight of the total filter-aid material. In yet further embodiments, the additional filtration component may comprise greater than about 80% by weight of the total filter-aid material.

In embodiments in which the filter-aid material comprising at least one composite filter-aid further comprises at least one additional filtration component, the composite filter-aid may comprise from greater than about 0% to about 100% of the total weight of the filter-aid material. In some embodiments, the composite filter-aid may comprise greater than about 5% by weight of the total filter-aid material. In other embodiments, the composite filter-aid may comprise greater than about 30% by weight of the total filter-aid material. In further embodiments, the composite filter-aid may comprise greater than about 50% by weight of the total filter-aid material. In yet other embodiments, the composite filter-aid may comprise greater than about 65% by weight of the total filter-aid material. In yet further embodiments, the composite filter-aid may comprise greater than about 80% by weight of the total filter-aid material.

In some embodiments, the at least one additional filtration component may comprise from about 60% to about 70% by weight of the total filter-aid material, and the filterable composite adsorbent may comprise from about 30% to about 40% by weight of the total filter-aid material. Specific properties of filter-aid materials comprising at least one filterable composite adsorbent can be modified by further physical or chemical reaction of the material after the initial filter-aid material comprising at least one filterable composite adsorbent has been made, for example, to enhance at least one property (for example, solubility and/or surface characteristics) and/or to yield a new product with a specialized use. Examples of such further modifications include, for example, hydration, acid washing, surface treatment, and organic derivatization, as disclosed, for example, in U.S. Pat. No. 6,712,974 to Palm et al.

C. Exemplary Methods of Using Exemplary Composite Filter-Aids

Filter-aid materials comprising at least one composite filter-aid described herein may be used in many of the same applications as currently available adsorbents, but may offer added properties, such as, for example, increased permeability, low centrifuged wet density, and uniquely shaped particles (e.g., fibers), as well as improved efficiency, and/or economy.

Filter-aid materials comprising at least one composite filter-aid and their optional further modifications, may be used in filtration applications in a manner analogous to that of porous filtration media. Filter-aid materials comprising at least one composite filter-aid may be applied to a septum to improve clarity and increase flow rate in filtration processes or added directly to the fluid. Depending on the particular separation involved, filter-aid materials comprising at least one composite filter-aid may be used in pre-coating, body feeding, or both.

In some embodiments, the method of adsorption and filtration comprises (i) providing a filter-aid material comprising at least one composite filter-aid, (ii) pre-coating a filter element with the composite filter-aid, and (iii) suspending the filter-aid material comprising at least one composite filter-aid in a fluid containing particles and/or constituents to be removed from the fluid, wherein the composite filter-aid may be supported on a filter element.

In other embodiments, the method of adsorption and filtration comprises (i) providing a composite filter-aid, (ii) further mixing the composite filter-aid with an at least second filtration component to form a filler-aid material (iii) pre-coating a filter element with the filler-aid material, and (iv) suspending the filter-aid material in a fluid containing particles and/or constituents to be removed from the fluid, wherein the filter-aid material may be supported on a filter element.

To increase or maximize the adsorption of particles and/or constituents, such as, for example, proteins, contributing to chill haze, some embodiments disclosed herein comprise a combination of pre-coating and body feeding.

In other embodiments, the method of adsorption and filtration comprises the step of passing a fluid containing undesired particles or constituents to be adsorbed through a filter-aid material comprising at least one composite filter-aid, in the form of a rigid shape supported on a septum.

Filter-aid materials comprising at least one composite filter-aid can be shaped, molded, extruded, sintered, or otherwise formed into permeable sheets, plates, disks, polyhedrons, or other formed shapes that have adsorbent properties. Fluids can then be passed through the filter-aid material comprising at least one composite filter-aid to achieve both filtration and adsorption.

The filter-aid material comprising at least one composite filter-aid disclosed herein may be used in conjunction with other media (e.g., different porous filtration component materials) to form a filter-aid material for use in filtration applications and/or to further modify a filtration process. For example, mixtures of the composite filter-aid with, for example, diatomite, expanded perlite, pumicite, natural glass, cellulose, activated charcoal, clay, or other materials, may be useful additional filtration components. Sometimes, these blends are more elaborate and enable the blend to be formed into sheets, pads, cartridges, or monolithic or aggregate media capable of being used as supports or substrates.

The filter-aid materials comprising at least one composite filter-aid disclosed herein can also be useful in applications other than filtration, since adsorbents or filtration media can be useful in applications that do not necessarily depend explicitly on either conventional adsorption or filtration. For example, substances such as silica gel, fumed silica, neutral clay, alkaline clay, zeolites, catalysts, polymers, and alkaline earth silicate hydrates can be used as fillers, and biogenic silica, natural glass, expanded perlite, pumice, expanded pumice, pumicite, expanded obsidian, expanded volcanic ash, buoyant glass, buoyant polymer, and cellulose can also be used as fillers.

Many other modifications and variations of the embodiments of the invention as hereinbefore set forth can be made without departing from the spirit and scope thereof. Other than in the examples, or where otherwise indicated, all numbers expressing quantities of ingredients, reaction conditions, and so forth used in the specification and claims are understood as being modified in all instances by the term "about." Accordingly, unless indicated to the contrary, the numerical parameters set forth in the following specification and attached claims are approximations that may vary depending upon the desired properties sought to be obtained herein. At the very least; and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope are approximations, the numerical values set forth in the specific examples are reported as precisely as possible. Any numerical value, however, inherently contain certain errors necessarily resulting from the standard deviation found in their respective testing measurements.

The headers used in this specification are presented for the convenience of the reader and not intended to be limiting of the inventions described herein. By way of non-limiting illustration, concrete examples of certain embodiments of the present disclosure are given below.

EXAMPLES

Filter-aid materials comprising at least one composite filter-aid as disclosed herein, as well as methods for preparing them, are described in the following examples, which are offered by way of illustration and not by way of limitation.

Example 1

A composite filter-aid was made using a Celite® 3Z, sodium silicate and sulphuric acid. 80 g of Celite® 3Z was added to 800 g of water. Next, 70 g of sodium silicate solution at 38% concentration was added to the mixture with constant stirring. Sulpuric acid (98%) is then added to adjust the pH to 8.5. When the pH reached approximately 8.5, a gelling reaction occurred, and the mixture thickened. With continued acid addition and stirring for 30 minutes, the slurry thinned out and the pH reached 8.0. The suspension was then filtered using a Buchner funnel. The filter cake was then reslurried with approximately 1 L of water and filtered again, then slurried again, and filtered again, in order to remove reaction byproducts (e.g., salts). Finally, the cake was then dried by heating it at 110° C. for three hours.

Table 1 provides porosimetry information for composite filter-aid manufactured by the exemplary process described above. Controls include three diatomite-based filter aids, Celite C3Z, Celite SSC (both available from World Minerals, Inc.), Celatom FP3 (available from Eagle Picher Corp.), and three silica gel products, including Lucilite® L10, Lucilite® XLC (both available from INEOS Silicas Ltd.), and Britesorb® D300 (available from PQ Corporation).

Table 1 below shows porosimetry and BET surface area for five different batches of diatomite-based composite filter-aid, compared with silica gels and regular calcined diatomite filter aids. As shown in Table 1, the exemplary composite filter aid material in samples A-E displays an Average Pore Diameter (4V/A), Total Pore Area, and BET Surface Area in ranges between those of the precipitated silica or diatomite based controls. In contrast, the Median Pore Size (Volume) of the exemplary composite filter aid material in samples A-E appears to correlate more to that of the diatomite control samples, while the Median Pore Size (Area) of the composite filter aid material in samples A-E appears to correlate more to that of the precipitated silica control samples.

One possible explanation for the difference between the two median pore diameter estimation methods is that the composite filter-aid may have a multimodal pore size distribution. When a volume mean pore diameter is estimated, the composite exhibits pores in the usual size range for diatomite-based filter aids. However, when an area mean diameter is calculated, the result is much lower than is found for a regular diatomite filter aid, and is even lower than is typical for a precipitated silica. The ratio of these diameters may been seen an indication of a presence of a large number of very fine pores in addition to the large volume of larger pores which is unique to this novel composite filter-aid.

Figure 1:
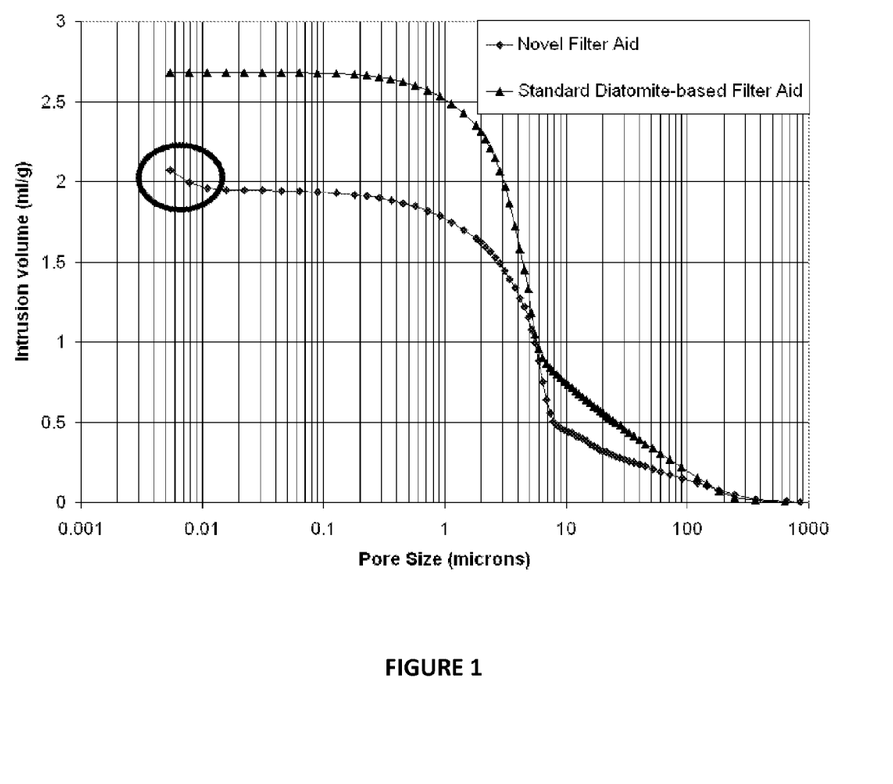
FIG. 1 shows the pore size distribution of the exemplary composite filter-aid contrasted with a typical diatomite filter aid.

FIG. 1 shows the pore size distribution of the exemplary composite filter-aid contrasted with a typical diatomite filter aid. Fine pores (below 10 nm in size) are clearly evident in the composite filter-aid, as measured using Mercury Intrusion Porosimetry.

TABLE 1

|  | Lucilite L10 | Lucilite XLC | Britesorb D300 | Celite 3Z | Celite SSC | Celatom FP-3 | Sample A 24μ | Sample B 27μ | Sample C 22μ | Sample D 24μ | Sample E 24μ |
| --- | --- | --- | --- | --- | --- | --- | --- | --- | --- | --- | --- |
| Total Intrusion Volume (mL/g) | 2.89 | 2.45 | 2.68 | 2.68 | 2.99 | 3.01 | 1.90 | 1.96 | 1.79 | 2.02 | 2.05 |
| Total Pore Area (m²/g) | 322 | 193.4 | 278 | 3.79 | 5.85 | 5.20 | 35.7 | 32.8 | 32.0 | 61.2 | 52.0 |
| Median Pore Diameter (Volume) (μm) | 1.25 | 3.05 | 1.83 | 4.83 | 3.37 | 4.54 | 4.95 | 5.13 | 4.46 | 4.44 | 4.62 |
| Median Pore Diameter (Area) (μm) | 0.0081 | 0.0095 | 0.0078 | 1.53 | 1.14 | 1.04 | 0.0070 | 0.0070 | 0.0068 | 0.0070 | 0.0067 |
| Average Pore Diameter (4 V/A) (μm) | 0.0360 | 0.0507 | 0.0385 | 2.82 | 2.05 | 2.32 | 0.2128 | 0.2397 | 0.2237 | 0.1322 | 0.1572 |
| Bulk Density at 0.28 psia (g/mL) | 0.2818 | 0.2838 | 0.2701 | 0.2985 | 0.2847 | 0.2905 | 0.3838 | 0.3824 | 0.4158 | 0.3807 | 0.3752 |
| Apparent (skeletal) Density (g/mL) | 1.53 | 0.93 | 0.97 | 1.49 | 1.93 | 2.30 | 1.42 | 1.54 | 1.63 | 1.65 | 1.61 |
| Porosity (%) | 81.6 | 69.6 | 72.3 | 79.9 | 85.2 | 87.4 | 73.0 | 75.1 | 74.4 | 76.9 | 76.7 |
| BET surface area (m²/g) | 292 | 556 | 314 | 3.40 | 4.11 | 3.04 | 65 | 71 | 66 | 57 | 62 |
| Pore size ratio = | 155 | 322 | 235 | 3.15 | 2.94 | 4.36 | 707 | 733 | 656 | 635 | 689 |

Example 2

Quantities more useful for trials at breweries were prepared as follows: 12,500 gallons of clean water were placed in a closed-topped agitated vessel. 10,500 lbs of Celite Super-Cel® were added to produce a well mixed slurry. 795 gallons of sodium silicate (at 38% purity) were then added. Approximately 83 gallons of 94% pure sulfuric acid was added to adjust the pH to 8.0. The slurry was then filtered three times to remove reaction byproducts.

Figure 2:
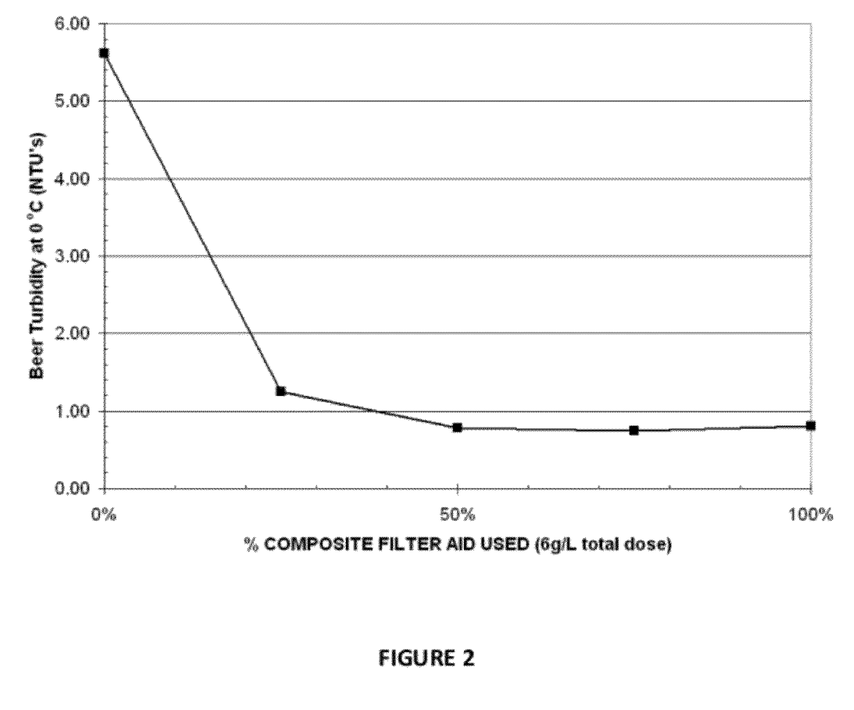
FIG. 2 shows chill haze data for beer contacted with blends of a diatomite filter aid and the diatomite-based composite filter-aid.

To show the efficacy of the diatomite-based composite filter-aid produced in this example, it is necessary to contact the material with beer, then heat-age and chill the beer to force any remaining haze precursors to precipitate. 300 ml of unfiltered lager was contacted with 1.8 g of regular diatomite-based filter aid for 10 minutes and was then filtered through a Buchner to remove all suspended solids including the filter aid. This experiment was repeated progressively replacing the regular diatomite-based filter aid (Celite 3Z®) with the diatomite-based composite filter-aid produced above. The beer sample produced in each case was bottled, left at 40° C. for 5 days, then refrigerated at 0° C. for 24 hours before the turbidity was measured using a nephelometric turbidimeter (model 2100N produced by Hach Company of Colorado). Table 2 below shows chill haze data for beer contacted with blends of a diatomite filter aid (Celite 3Z®) and the diatomite-based composite filter-aid. The turbidity can be seen to decrease with increasing dose of the diatomite-based composite filter-aid, with little benefit beyond doses of around 3 g/L. FIG. 2 shows chill haze data for beer contacted with blends of a diatomite filter aid (Celite 3Z®) and the diatomite-based composite filter-aid.

TABLE 2

| Composite Dose g/L | Diatomite Dose g/L | Forced Aging Turbidity at 0° C. EBC |
|---|---|---|
| 0 | 6 | 5.62 |
| 1.5 | 4.5 | 1.25 |
| 3 | 3 | 0.78 |
| 4.5 | 1.5 | 0.75 |
| 6 | 0 | 0.80 |

What is claimed is:

1. A composite filter aid material comprising:
at least one filtration component and at least one adsorption component;
wherein the composite filter aid has an Average Pore Diameter, 4V/A, ranging from about 0.1 micron to about 0.5 micron and a permeability ranging from about 50 to about 1000 millidarcies; wherein the at least one filtration component comprises diatomite or perlite and wherein the at least one adsorption component comprises precipitated silica.

2. The composite filter aid material of claim 1, wherein the composite filter aid material further has an Average Pore Diameter, 4V/A, ranging from about 0.1 micron to about 0.3 micron.

3. The composite filter aid material of claim 1, wherein the composite filter aid material has a permeability ranging from about 150 millidarcies to about 400 millidarcies.

4. The composite filter aid material of claim 1, wherein the composite filter aid material further has a Total Pore Area ranging from about 20 to about 80 m²/g.

5. The composite filter aid material of claim 1, wherein the composite filter aid material further has a BET surface area ranging from about 30 to about 200 m²/g.

6. The composite filter aid material of claim 1, wherein the composite filter aid material has a median particle size ranging from about 5 microns to about 40 microns.

7. The composite filter aid material of claim 1, wherein the composite filter aid material has a porosity ranging from about 70% to about 95%.

8. The composite filter aid material according to claim 1, wherein the at least one adsorption component comprises from about 5% to about 40% by weight of the composite filter-aid.

9. A composite filter aid material comprising:
at least one filtration component and at least one adsorption component;
wherein the composite filter aid has an Average Pore Diameter, 4V/A, ranging from about 0.1 micron to about 0.5 micron and a Total Pore Area ranging from about 10 to about 100 m²/g; wherein the at least one filtration component comprises diatomite or perlite and wherein the at least one adsorption component comprises precipitated silica.

10. The composite filter aid material of claim 9, wherein the composite filter aid material has an Average Pore Diameter, 4V/A, ranging from about 0.1 micron to about 0.3 micron.

11. The composite filter aid material of claim 9, wherein the composite filter aid material has a Total Pore Area ranging from about 20 to about 80 m²/g.

12. The composite filter aid material of claim 9, wherein the composite filter aid material has a Total Pore Area ranging from about 30 to about 50 m²/g.

13. The composite filter aid material of claim 9, wherein the composite filter aid material further has a BET surface area ranging from about 30 to about 200 m²/g.

14. The composite filter aid material of claim 9, wherein the composite filter aid material has a median particle size ranging from about 5 microns to about 40 microns.

15. The composite filter aid material of claim 9, wherein the composite filter aid material has a permeability ranging from about 50 millidarcies to about 1000 millidarcies.

16. The composite filter aid material of claim 9, wherein the composite filter aid material has a porosity ranging from about 70% to about 95%.

17. The composite filter aid material according to claim 9, wherein the at least one adsorption component comprises from about 5% to about 40% by weight of the composite filter aid material.

18. A composite filter aid material comprising:
at least one filtration component and at least one adsorption component;
wherein the composite filter aid has a pore size ratio of at least about 200 wherein the at least one filtration component comprises diatomite or perlite and wherein the at least one adsorption component comprises precipitated silica.

19. The composite filter aid material of claim 18, wherein the composite filter aid material further has a pore size ratio of at least about 400.

20. The composite filter aid material of claim 18, wherein the composite filter aid material further has a pore size ratio from about 200 to about 2000.

21. The composite filter aid material of claim 18, wherein the composite filter aid material further has a BET surface area ranging from about 30 to about 200 m²/g.

22. The composite filter aid material of claim 18, wherein the composite filter aid material has a median particle size ranging from about 5 microns to about 40 microns.

23. The composite filter aid material of claim 18, wherein the composite filter aid material has a permeability ranging from about 50 millidarcies to about 1000 millidarcies.

24. The composite filter aid material of claim 18, wherein the composite filter aid material has a median pore diameter by volume ranging from about 1 micron to about 10 microns.

25. The composite filter aid material of claim 18, wherein the composite filter aid material has a median pore diameter by volume ranging from about 3 microns to about 6 microns.

26. The composite filter aid material of claim 18, wherein the composite filter aid material has a median pore diameter by area ranging from about 1 nm to about 50 nm.

27. The composite filter aid material of claim 18, wherein the composite filter aid material has a median pore diameter by area ranging from about 1 nm to about 10 nm.

28. The composite filter aid material of claim 18, wherein the composite filter aid material has a porosity ranging from about 70% to about 95%.

29. The composite filter aid material according to claim 18, wherein the at least one adsorption component comprises from about 5% to about 40% by weight of the composite filter aid materail.

30. A composite filter aid comprising:
at least one filtration component and at least one adsorption component;

wherein the composite filter aid has:
a permeability ranging from about 50 millidarcies to about 1000 millidarcies,
a BET surface area ranging from about 30 to about 200 m²/g, and
wherein the composite filter aid has a ratio of median pore diameter by volume to median pore diameter by area of at least about 200 wherein the at least one filtration component comprises diatomite or perlite and wherein the at least one adsorption component comprises precipitated silica.

* * * * *

UNITED STATES PATENT AND TRADEMARK OFFICE
CERTIFICATE OF CORRECTION

| | | |
|---|---|---|
| PATENT NO. | : 8,242,050 B2 | Page 1 of 1 |
| APPLICATION NO. | : 12/883529 | |
| DATED | : August 14, 2012 | |
| INVENTOR(S) | : Jie Lu and Jarrod R. Hart | |

It is certified that error appears in the above-identified patent and that said Letters Patent is hereby corrected as shown below:

Claim 29, col. 20, line 64, "materail" should read -- material --.

Signed and Sealed this
Twenty-third Day of October, 2012

David J. Kappos
*Director of the United States Patent and Trademark Office*